June 30, 1964  G. B. LEWIS  3,138,992
THERMAL PROTECTOR TUBE AND SHIELD
Filed Dec. 12, 1962  6 Sheets-Sheet 1

INVENTOR.
GRIFFITH B. LEWIS
BY
John P. Murphy
ATTORNEY

June 30, 1964  G. B. LEWIS  3,138,992
THERMAL PROTECTOR TUBE AND SHIELD
Filed Dec. 12, 1962  6 Sheets-Sheet 3

INVENTOR.
GRIFFITH B. LEWIS
BY
John P. Murphy
ATTORNEY

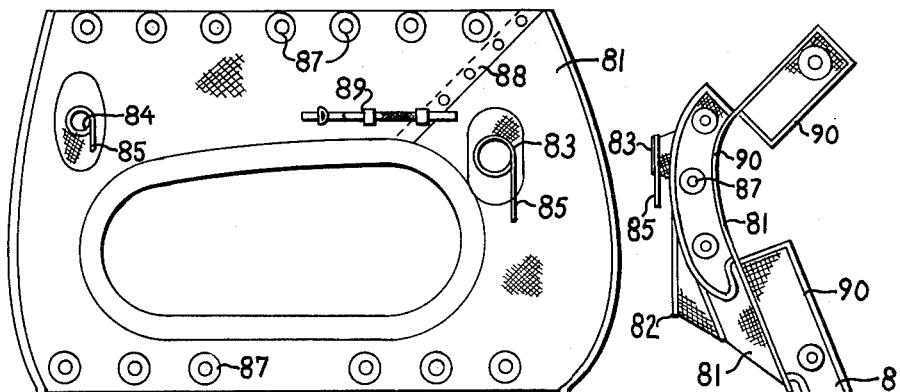

INVENTOR.
GRIFFITH B. LEWIS
BY John P. Murphy
ATTORNEY

June 30, 1964   G. B. LEWIS   3,138,992
THERMAL PROTECTOR TUBE AND SHIELD
Filed Dec. 12, 1962

INVENTOR.
GRIFFITH B. LEWIS
BY John P. Murphy
ATTORNEY ated June 30, 1964

United States Patent Office 3,138,992

3,138,992
THERMAL PROTECTOR TUBE AND SHIELD
Griffith B. Lewis, Watervliet, N.Y., assignor to Fulton Fastener Corporation, New York, N.Y., a corporation of New York
Filed Dec. 12, 1962, Ser. No. 244,146
9 Claims. (Cl. 89—36)

This invention relates to armored vehicles, and more particularly, to a ballistic shield for vulnerable openings in armored vehicles.

The design of mobile heavy armament has been advanced as a result of the past wars to the extent that the increased firepower of battle units has been met with the ability of tanks and the like to withstand same without a corresponding increase in personnel and material loss. Such vehicles are conventionally provided with openings through which guns, sighting instruments, and the like are projected. The openings not only afford the occupants the opportunity to see to maneuver the tank and to direct their own guns, but afford an enemy the opportunity to direct missiles, small arms fire and the like against the occupants of the tank. Often, a missile hit, blast or the like causes shrapnel fragments to enter the vulnerable openings of the tank, causing casualties, and malfunction of the operating parts of the tank.

Various types of shields have been proposed to minimize this condition, including a heavy type formed of armor plate which may be mounted directly to the gun adjacent the opening for movement with the gun, or mounted around the gun but movable with the opening which is exposed. However, due to the inherent rigidity of such a shield small crevices remain exposed to small arms fire or blasts for missiles and the like. Other types include a closure for the opening whereby a narrow slot remains in which the gun may be moved. This slot also leaves and opening through which enemy fire may reach the occupants of the tank. Further, each of the above representative types affords only limited movement of the gun projecting through the opening.

Another and more recent problem has arisen with the development and use of a rapid fire machine gun. One such gun is the NATO gun, so-called because of its adoption under NATO agreements. However, the problem is merely exemplified by the characteristics of this particular gun and is not necessarily restricted thereto. This gun generates up to 1380° F. barrel temperature when in operation, thereby causing failure of some ballistic shields due to the high temperatures, thence failing to protect the occupants of the tank from the intense heat also and from enemy fire. This condition is most prevalent with certain generic types of shields and the full details will become apparent in the description of this invention.

It is therefore a primary object of this invention to provide a ballistic shield for the vulnerable openings in vericles, which will accommodate a high temperature gun and which is insulated against the heat generated by the gun and which is also adapted to protect the occupants of the vehicle from enemy action.

Another object of the invention is to provide a shield for the vulnerable openings in vehicles which is light in weight and small in size, whereby additional, bulky structure need not be provided to accommodate the shield.

Another object of the invention is to provide a shield which will be primarily invulnerable to blast and shrapnel fragments by enemy action.

One other object of the invention is to provide a shield for vulnerable openings which affords a great degree of freedom of movement for the guns which operate through said openings, which at the same time cover the openings fully.

Other objects and advantages will become apparent from the following detailed specification, when read with reference to the accompanying drawings.

In carrying out the objects of this invention there is provided for use with an armored vehicle having vulnerable openings through which a gun or instrument or the like is adapted to operate, a ballistic shield secured within the opening and around the gun or instrument, whereby the shield is yieldably disposed within the opening and movable with the gun or instrument; and a second shield in combination with the ballistic shield for adapting the ballistic shield to be used around a gun or instrument which operates at a high temperature.

In the drawings:

FIG. 5 is a front view of a modification of the ballistic shield.

FIG. 6 is a side elevation of the shield of FIG. 5.

FIG. 7 is a front elevation of another embodiment of a ballistic shield.

Figure 1:
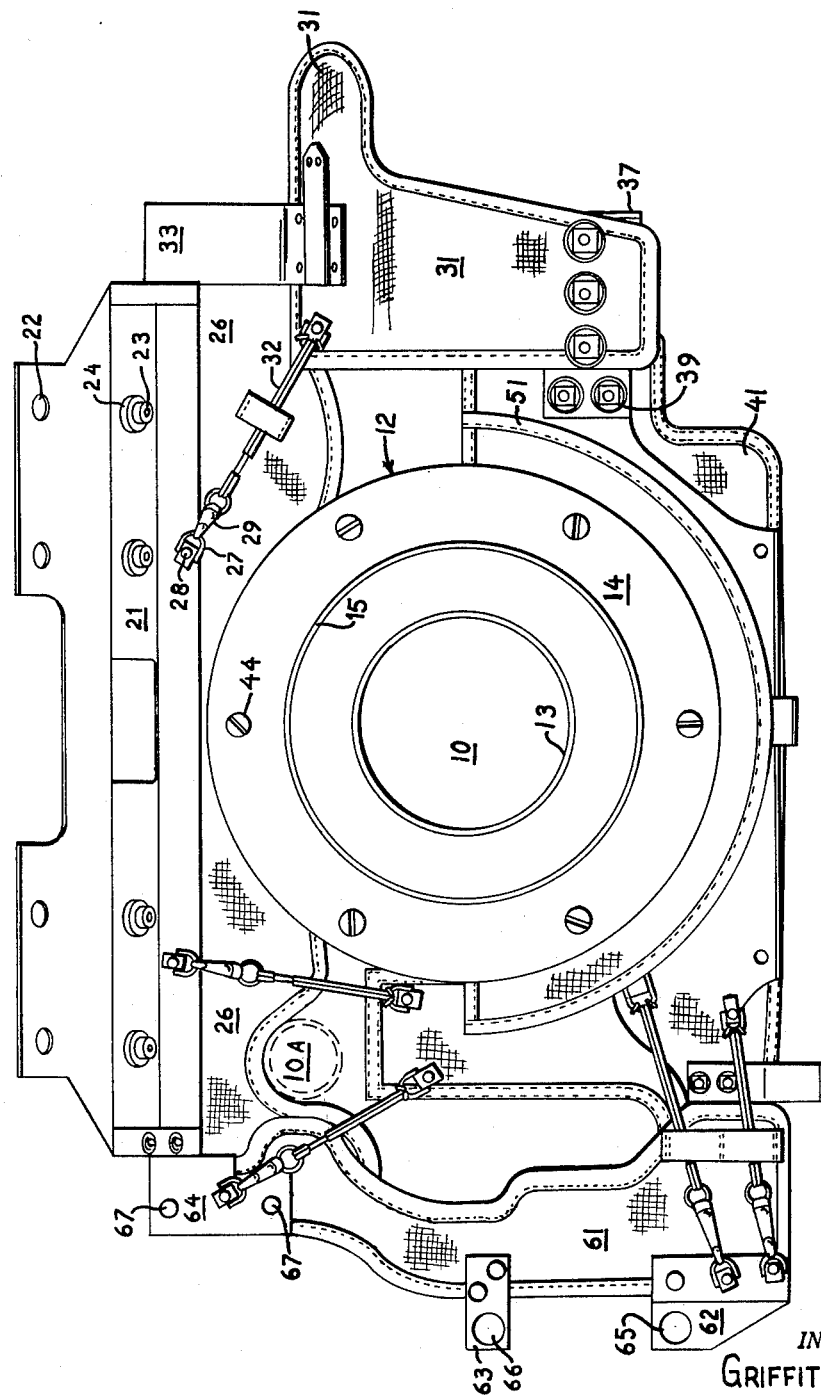
FIG. 1 illustrates a ballistic shield disposed in position, as seen from within the turret of an armored vehicle and looking outwardly through the opening.
Figure 2:
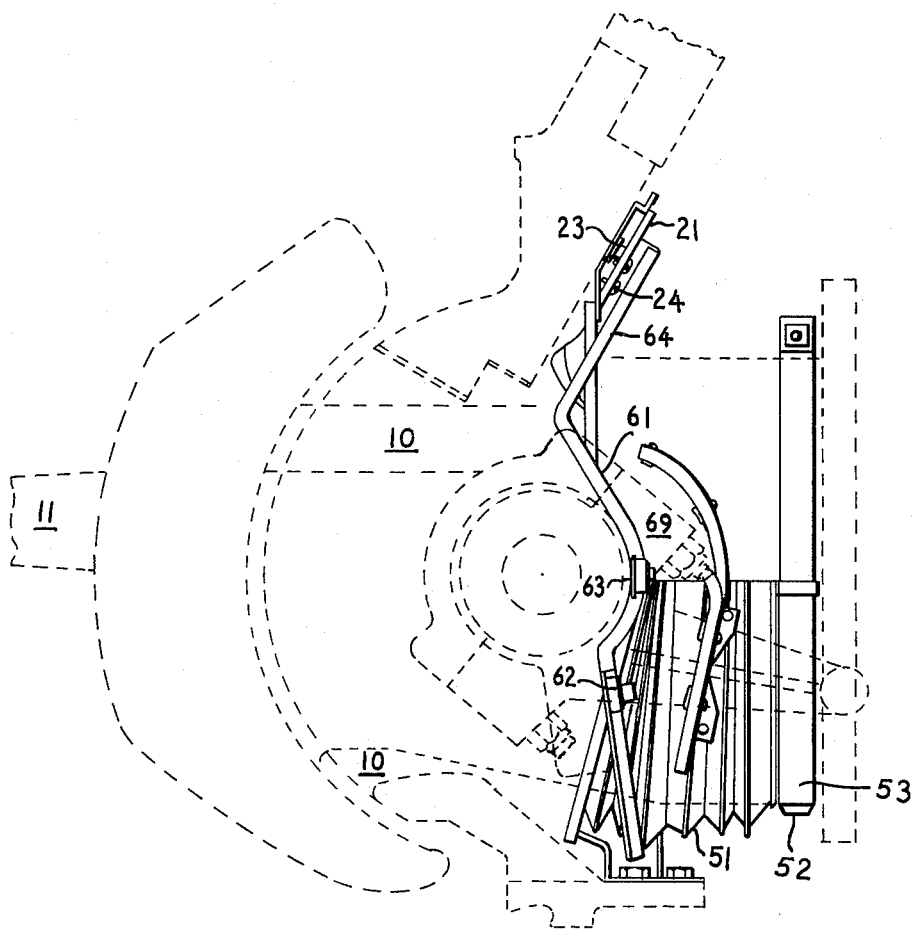
FIG. 2 is a sectional side elevation of the ballistic shield in position in a tank.

Referring to FIGS. 1 and 2, a portion of the turret or the like of an armored vehicle such as a tank is indicated, having an opening 10 through which a gun or instrument 11 may project. It is to be understood that the gun 11 (as hereinafter referred to) may operate through the opening 10, that is, perform its function while projecting through the opening; and that the gun is exemplary of any type of gun such as a large caliber gun, NATO machine gun, or other instrument such as a sighting instrument, etc.

Figure 4:
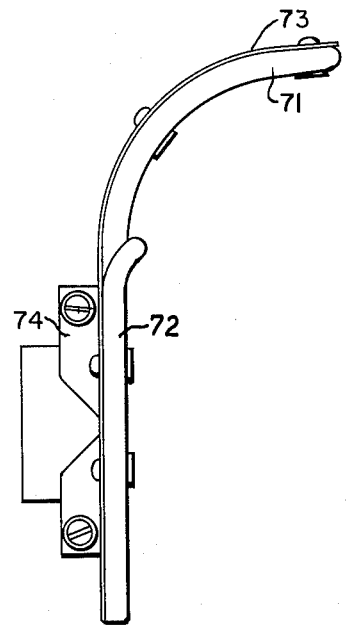
FIG. 4 is a side elevation of a bracket and pad forming part of the ballistic shield of FIG. 2.

In order to prevent the entrance of shrapnel and small caliber fire and the like, means is provided for effecting a closure of the opening 10. In the embodiment shown in FIGS. 1, 2 and 4, the shield comprises a plurality of ballistic pads yieldably attached or connected together within the opening 10. In this embodiment the shield includes a top section having a ballistic pad 26 and a mounting plate 21. The pad 26 is fastened to the plate 21, which is then bolted in place by studs 23 and nuts 24 through the holes 22. The plate 21 may be shaped so as to conform to the shape of the inside of the turret adjacent the opening 10. A D-ring 27 may be fastened to the ballistic pad 26 as by rivets or the like through the tab 28. A ballistic pad 31 is disposed at one side of the opening 10, and is held in place to the side of the gun 11 by means of the plate 33 to which pad 31 is fastened, as by rivets. A bungee cord 32 is fastened to the pad 31 and a snap hook 29 on the end thereof may be connected with the D-ring 27 for yieldably fastening pads 26 and 31 together. Lower mounting plate 39 has another plate 37 bolted thereto; and the ballistic pad 31 is in turn fastened to the plate 37 by means of bolts fastened through the grommets 36. The plate or bracket 39 may extend substantially across the bottom of the opening 10 to form a frame for the pad 41. The pad 41 is fastened to the bracket 39 by rivets or bolts. A ballistic pad 61 is disposed in the remaining side of the opening 10, and is riveted or bolted there to the brackets 62, 63 and 64 which are, in turn, fastened to the turret of the tank by means of bolts 65, 66 and 67. The various snap hooks 29, bungee cords 32 and D-rings 27 are provided for holding the pads 26, 31, 41 and 61 yieldably together and yieldably in position in the opening of the turret. Thus, should a missile such as a grenade or the like explode adjacent the opening 10, the blast from the explosion is absorbed by the pads as they yieldably move from the concussion of the blast. Fragments of shrapnel are stopped by the pads forming the shield in the same manner. It has been discovered that a shield which is stretched or disposed in a taut manner in the opening 10 will readily permit the entry of fragments, which will puncture the taut shield; whereas a shield in accordance with this invention will yield slightly from the impact. In this manner the velocity of the fragments is gradually lessened and their penetrating and shocking power is reduced to within harmless range.

Auxiliary pads 71 and 72 may be provided in the case where an instrument (not shown) may project through the opening 10. In this case, the auxiliary pads 71 and 72 may be held together by means of brackets 73 and 74, FIG. 4. It will become apparent that such auxiliary brackets 73 and 74 may also be constructed so as to mount to the instrument for movement therewith, thus permitting the auxiliary pads 71 and 72 to move with the instrument to close the opening at all times during said movement.

Another feature of this invention will become apparent from the illustration of the pad 51 which in this embodiment may be in the form of a bellows, being formed from semicircular segments fastened together. The bellows pad 51 is fastened to the bracket 39 at the bottom of the opening 10. A sleeve 53 is formed in one end of the bellows 51, a spring band 52 is placed through the sleeve 53, and is in turn fastened around the gun 11 to the rear so that the bellows projects inwardly through the opening. The padding 26, 31, 41, 51, 61, 71 and 72 forms the ballistic shield which then projects inwardly over the gun 11 in the opening. Any other opening 10A or the like may be formed through the shield to accommodate other guns or instruments (not shown).

The main feature of this invention is the auxiliary shield 12 (FIG. 1) used in combination with the ballistic shield described above. The second, or auxiliary shield 12 is disposed through the opening 10 for the purpose of insulating a high temperature gun from the first or primary ballistic shield. It will be assumed that the ballistic shield just described is adapted for use with a gun (not shown) which operates at high temperatures. One such gun is the NATO machine gun, which becomes heated at times to 1380° F. Due to the necessity of the ballistic shield being flexible, it is obvious that the material for the ballistic shield must be restricted to that which will perform satisfactorily in climactic conditions as will be found in arctic, temperate and tropical areas. Certain materials which satisfy these requirements will not additionally withstand the very high operating temperature of a gun such as the NATO machine gun as well, without breaking down to the point that the ballistic shield in which they are used will fail outright.

Figure 3:
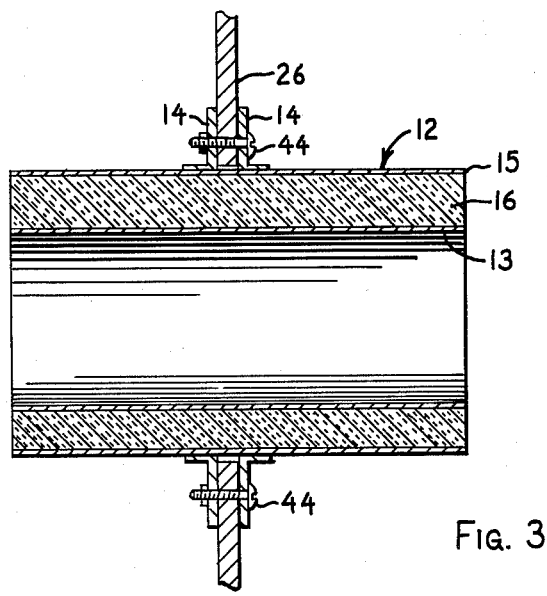
FIG. 3 is a fragmentary sectional side view of the second or auxiliary shield carried by the first or ballistic shield.

The combination of the second shield 12 with the first ballistic shield is best shown in FIGS. 1 and 3. Here it will be seen that the second shield 12 is cylindrical in form and comprises an outer wall 15 extending the length of the shield 12 and being cylindrical in shape. At some point intermediate the ends of the outer wall 15 is disposed a pair of cylindrical flanges 14 for attaching the second shield to the ballistic shield. The flanges 14 may be formed with mounting holes therethrough through which any suitable bolts 44 or the like may be disposed. It is obvious that the edge of the pad 26 defining the opening 10 will be disposed between the flanges 14 to facilitate fastening the two members together with the bolts 44. The wall 15 may be formed from aluminum or some other lightweight metal. Spaced concentrically inwardly from the outer wall 15 is an inner wall 13 which is also cylindrical in shape, and which should advantageously be formed from 300 series stainless steel or the like. Disposed between the inner wall 13 and the outer wall 15 is a filler of insulating material 16, for providing heat insulation between the gun (not shown) and the ballistic shield pad 26. One excellent material is Micro Quartz, a vitreous silica fiber material produced by Johns-Mansville. With the second shield 12 in place through the opening 10 in the ballistic shield, a gun barrel may then be disposed through the inner wall opening defined by wall 13 of the second shield 12.

The ballistic shield may be changed in shape as is shown in the embodiments according to FIGS. 5 to 9. In this embodiment the bellows pad has been omitted. In its place, the shield is formed so as to completely enclose the opening of the turret (not shown). The shield is fastened in place in the opening and also around guns and instruments. In FIGS. 5 and 6, for example, there is shown a ballistic shield body 81 having a gun opening 82 formed therein. Similar openings 83 and 84 are formed, as for instance, to accommodate respectively a machine gun and a telescope, or two machine guns. Straps 85 may be provided for drawing the boots forming the openings 83 and 84 around the instruments protruding therethrough. Grommets 87 are provided for facilitating the placing of bolts or the like therethrough for fastening the shield 81 in the turret. A flap closure 88 with fastener strap 89 is also provided for opening the shield to service the guns and the like. Side flaps 90 are also provided for the sides of the opening in the turret, and may be provided additionally with grommets 87 and with tabs 86 to ensure that the opening in the turret is completely closed. It will be understood that with this embodiment of FIGS. 5 and 6, as well as for the embodiments of FIGS. 7 to 9, that these forms of the ballistic shield do not differ basically from the concept of FIGS. 1 and 2, but differ only in the various openings which may be formed and with the shape of the shields themselves, whereby the shields may be used with various tanks.

FIG. 7 shows still another shield having a body member 91. This member 91 is formed onto a surrounding and underlying member 99. Grommets 98 in member 99 are provided for placing bolts therethrough for fastening the shield in the opening of a tank. Flap members 96 and 97 are provided with corresponding straps 96A and 97A for closing the same by placing the cords through D-rings provided for that purpose. The instrument and gun opening boots 93 and 94 have draw-straps 95 thereon for drawing the boots around their respective guns or instruments or the like. A strap 100 is placed through a suitable sleeve 102 and has a snap device 101 of conventional type for drawing the shield 91 around the gun in the opening 92. In this particular application of the second shield in combination with the ballistic shield, the strap 100 would draw the shield 91 into the space between the flanges 14 of the second shield 12; or the draw-straps 25 would be used for drawing the boots 93 or 94 into the space between the flanges 14 of the second shield 12. It will be apparent that the second shield, to be adapted to all embodiments of a ballistic shield, is adapted to be formed in different diameters for the various size gun openings in which it is to be used and for the various size gun barrels which will be insulated by it.

Figure 8:
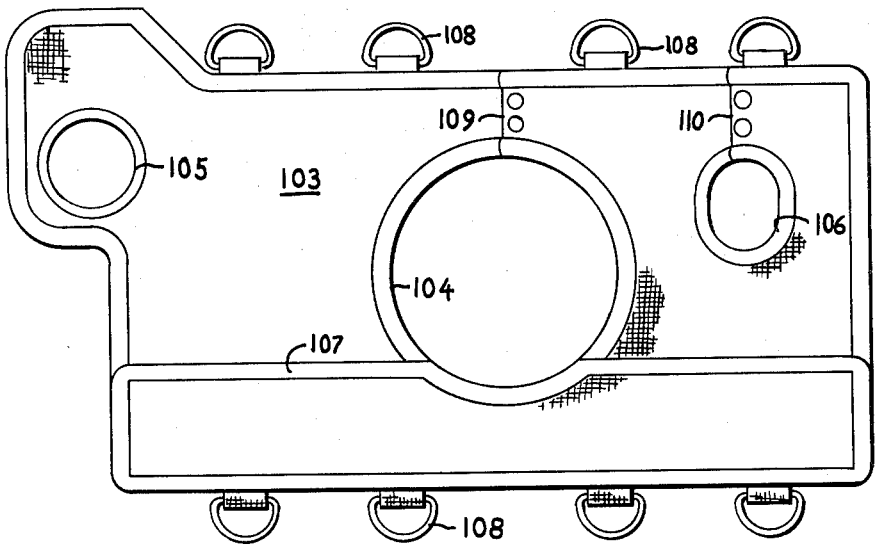
FIG. 8 is an elevation of a body member of another embodiment of a ballistic shield.

The embodiment of FIG. 8 is similar, having the shield 103 with the opening 104 therein for the main armament. The openings 105 and 106 are for the smaller guns or instruments, and have the opening flaps 109 and 110 for servicing the guns. Another pad 107 is fastened at the bottom of the shield 103 for reinforcement. D-rings 108 are provided for fastening the shield to the tank.

Figure 9:
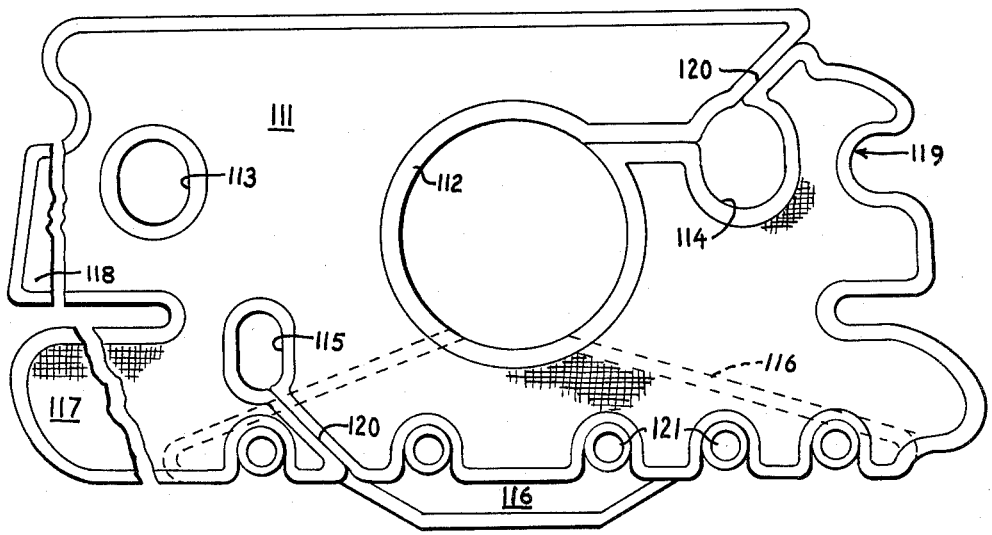
FIG. 9 illustrates another embodiment of a ballistic shield.

The embodiment according to FIG. 9 illustrates the shield 111 as having the main armament hole 112 and the smaller openings 113, 114 and 115 for smaller guns and instruments. Extension flaps as at 117 and 118 are formed on the shield 111 for covering any irregular areas in the opening 10 of the turret. Also, the cutout such as at 119 may be provided for circumventing any obstructions adjacent the opening in the tank. Cuts as at 120 are formed from the sides of the shield 111 to the various openings to facilitate opening of the shield to service the guns. Reinforcing panels as at 116 may be sewn to the shield where required. Grommets 121 are also formed as needed for fastening the shield in the opening of the tank.

With each of the above embodiments (FIGS. 8 and 9), openings are formed for the guns, and it is the intention of the invention that the second or auxiliary shield 12 would be used in combination with any embodiment of a ballistic shield for the insulation of the shield against the heat of a high temperature gun. While several modifications of ballistic shields are shown herein, it is to be understood that each is basically similar to that of FIG. 1, and the second or auxiliary shield 12 has accordingly been shown in place only in FIG. 1.

Figure 10:
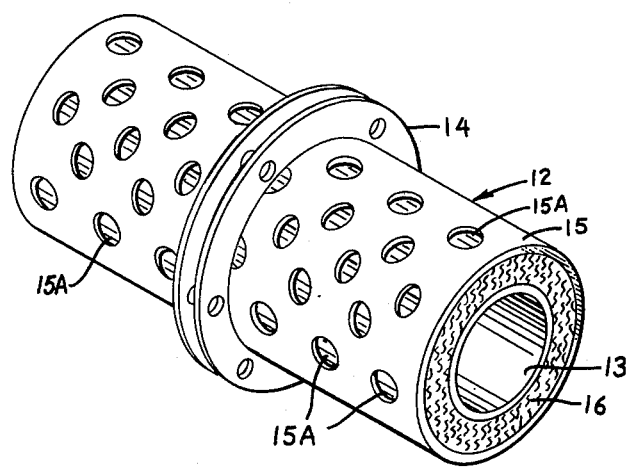
FIG. 10 is an isometric view of an auxiliary shield.

FIG. 10 illustrates a modification of the invention of the second shield 12 wherein the inner wall 13 and outer wall 15 are arranged in the same manner as in FIG. 3. However, the outer wall 15 is perforated or otherwise formed with holes 15A therethrough to increase the escape of heat therethrough from the shield 12 as it insulates the ballistic shield from the heat of a gun.

Figure 11:
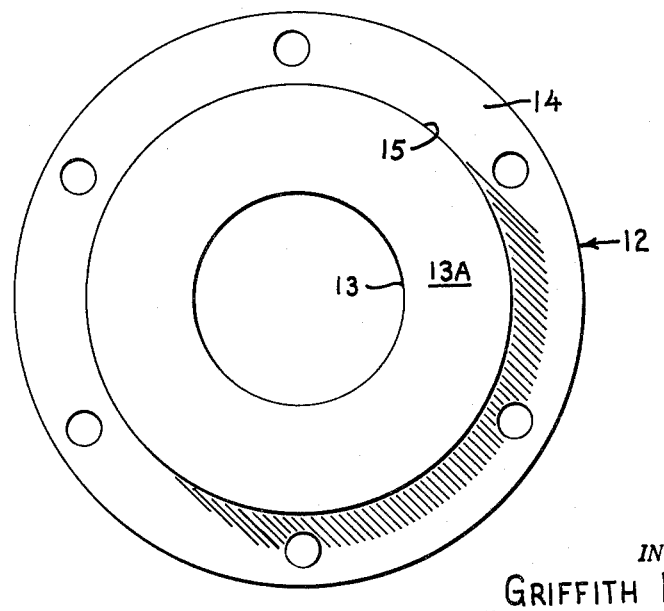
FIG. 11 illustrates a modification of the shield of FIG. 10.

FIG. 11 is an end elevation of yet another modification of the second shield 12. All basic members of the modification according to FIG. 11 are the same as the embodiment of FIG. 3, except that the inner wall 13 is joined to the outer wall 15 at the ends of the shield 12 as at 13A. This may be accomplished by forming the metal of the inner wall 13 outwardly at the ends thereof as flange-like extensions which are fastened to the ends of the outer wall 15. The advantage here is realized in preventing the accidental loss of the insulating material from between the inner and outer walls due to vibration or the like.

It should be noted that the materials used for the ballistic shields must be resistant to the flash heats of explosions and yet be somewhat flexible and yieldably disposed in the vehicle so as to be flexible to ballistic attacks. The combination of the second shield with a ballistic shield offers maximum protection to personnel within a vehicle while permitting the personnel the maximum in freedom of movement of their guns and instruments. While the materials disclosed herein are advantageous for use, all possibilities for use of other material is recognized.

Various embodiments of the invention having been shown and described, it is to be understood that the invention is not to be limited thereto, but is to be construed as fairly falls within the scope of the appended claims.

I claim:

1. The combination with an armored vehicle having an opening and a gun projecting through the opening; a ballistic shield comprising a combination of pads yieldably disposed in the opening and around the gun, and a second shield disposed between the gun and said ballistic shield for insulating said ballistic shield against the heat of the gun.

2. In an armored vehicle having an opening and a gun projecting through the opening; the combination of a first ballistic shield disposed around the gun in the opening and a second shield disposed around the gun between and the first said shield; said ballistic shield comprising a combination of ballistic pads yieldably connected together, said ballistic shield being yieldably disposed in the opening against the entry of shrapnel fragments therethrough, said second shield comprising an inner cylindrical wall disposed around the gun and an outer cylindrical wall spaced concentrically from said inner wall and insulating material disposed between said inner and outer walls, and means for attaching said second shield to said ballistic shield.

3. In an armored vehicle having an opening and a gun projecting through the opening; the combination of a first, ballistic shield yieldably disposed in the opening in the vehicle and around the gun, and a second shield carried by said first shield for insulating said first shield from the gun; said first shield comprising ballistic pads yieldably connected together forming an opening therethrough for the gun, said second shield comprising an inner wall disposed around the gun and an outer wall spaced concentrically from said inner wall, means formed from said outer wall for fastening said second shield in the said gun opening of said first shield, and fibrous high temperature insulating material disposed between said inner and outer walls, whereby to insulate said ballistic shield from the heat generated by a high temperature gun disposed through said second shield in the opening of said ballistic shield.

4. The combination of a ballistic shield for use with a gun; and a second shield carried by the ballistic shield and adapted to have a gun disposed therethrough; said second shield including an inner wall defining a cylinder, an outer wall spaced concentrically from said inner wall, and high temperature insulating material disposed between said inner and outer walls.

5. The combination according to claim 4; wherein said insulating material includes vitreous silica fibers.

6. An auxiliary shield for use with a ballistic shield comprising an inner wall forming a cylinder, an outer wall spaced concentrically from said inner wall, each said wall being formed of stainless steel, high temperature insulating material including vitreous silica fibers disposed between said inner and outer walls, and adapter means adapting said auxiliary shield to be carried by a ballistic shield.

7. The auxiliary shield according to claim 16, said outer wall being perforated whereby to dissipate heat rapidly.

8. The auxiliary shield according to claim 6; the ends of said inner wall being formed outwardly joining the said outer wall for closing the ends of said shield between said walls.

9. An auxiliary shield and a ballistic shield in combination, said auxiliary shield comprising an inner wall forming a cylinder, an outer wall spaced concentrically from said inner wall, said walls being formed of stainless steel and aluminum respectively, high temperature insulating material including vitreous silica fibers disposed between said inner and outer walls, and flanges adapting said auxiliary shield to be carried by said ballistic shield.

References Cited in the file of this patent

UNITED STATES PATENTS

| 2,381,981 | Moore | Aug. 14, 1945 |
| 2,965,994 | Sullivan | Dec. 27, 1960 |

FOREIGN PATENTS

| 510,742 | Great Britain | Aug. 8, 1939 |